Feb. 24, 1925.
A. BUSCH
MILK BOTTLE HEATER
Filed May 10, 1924
1,527,629
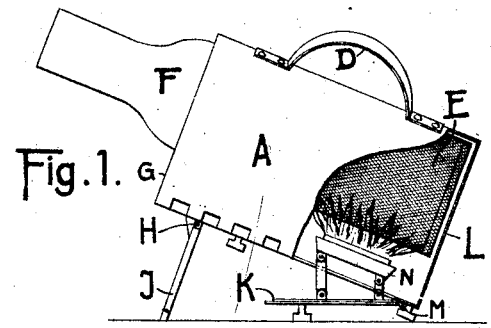
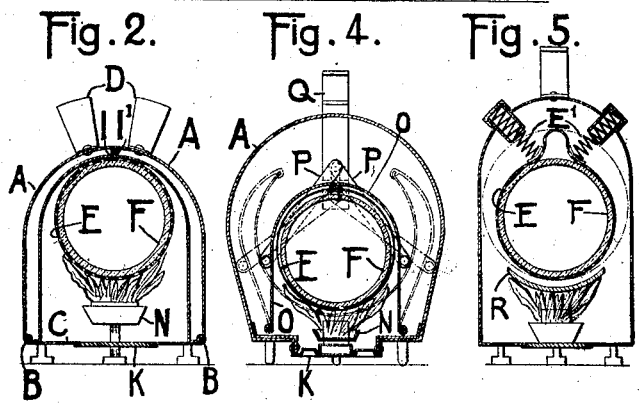
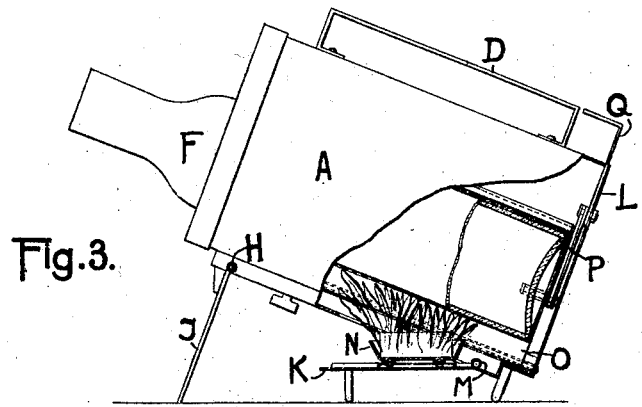
Inventor
A. Busch
by Langner, Parry, Card & Langner
Attys.

Patented Feb. 24, 1925.

1,527,629

UNITED STATES PATENT OFFICE.

AUGUSTO BUSCH, OF BASEL, SWITZERLAND, ASSIGNOR TO SOCIETY META A. G., OF BASEL, SWITZERLAND.

MILK-BOTTLE HEATER.

Application filed May 10, 1924. Serial No. 712,363.

*To all whom it may concern:*

Be it known that I, AUGUSTO BUSCH, a subject of the King of Italy, and resident of Basel, Switzerland, have invented new and useful Improvements in Milk-Bottle Heaters, of which the following is a full, clear, and exact specification.

Hitherto known milk bottle heaters having a mantle for insertion of the bottle have a series of difficulties and disadvantages which, however small they seem at first sight, have up to the present prevented them from coming into use. In particular, it is impossible with them to adjust the mantle or casing to suit different sizes of bottles, and to close the mantle over the bottle, so as to avoid the danger of local overheating.

According to the present invention this danger is overcome by the feature that the mantle for the bottle to be warmed consists of an enlargeable wire netting and is provided with means to closely adjust it round the bottles of any size as well as to allow its disengagement therefrom. The mantle may be provided with one or more longitudinal slits and can be enlarged or reduced in size according to the size of the bottle to be warmed by means of suitable mechanism, for instance a lever device acting on the edges of the slit portion. This mechanism also enables the mantle to be closely fitted round the bottles. The mantle and the frame carrying it are preferably held in a sloping position by means of a pillar, whilst the mantle and the burner are arranged parallel with or at an angle to one another, so as to obtain the greatest possible efficiency and equal spreading of the flame over the mantle. The heating of the bottle is thus partly effected by hot air, partly by conduction of the mantle. The heating power of the fuel is therefore almost completely utilized. The milk bottle heater according to the invention, is for this reason adapted for the use of compressed metaldehyde as fuel, since tablets of the same size will always give the same temperature. The milk bottle heater is therefore economical, clean and in consequence of the absence of danger with metaldehyde as compared with the spirits or gas hitherto used for this purpose, extremely safe in use.

The accompanying drawings show three constructional examples of the invention.

Figure 1 shows in side view, partly in longitudinal section, and

Figure 2 in transverse section a milk bottle heater, in which opening and closing of the mantle is effected by means of a casing in two parts, which hold the mantle and which are themselves movable.

Figure 3 shows in side view and longitudinal section a constructional example according to the invention, in which the adjustment in size of the mantle is effected by a lever device;

Figure 4 is a transverse section thereof;

Figure 5 shows a closed mantle which can be adjusted onto the bottle by lateral gripping springs.

The bottle heater shown in Figures 1 and 2 consists of a sheet metal casing with two movable side walls A, which are attached to the bottom C of the casing by hinges B, so that it can be opened or closed. The side walls are bent inwards at the top to form clasps and carry on their abutting edges I and I' a slit wire-netting mantle E arranged inside of the casing, which mantle serves to carry the bottle F to be heated. By means of handles D secured to the clasp like side walls A the bottle heater can be carried as well as opened or closed. If the apparatus is opened, the slit mantle E participates in the turning movement of the side walls A, its opening is enlarged and the bottle to be heated can easily be slid into the mantle. By closing the bottle heater the mantle folds round the bottle owing to its flexibility. The side walls A participate in this movement and their upper edges move towards one another a distance depending on the size of the bottle inserted. The bottom C of the apparatus carries near the front wall G of the casing a prop J on a hinge H, by which means the bottle heater can be placed obliquely. Further, the bottom is provided with a flap K, mounted in a hinge M. This flap carries a burner N, which when compressed metaldehyde is used, is a simple metal shell for taking the tablets.

Figures 3 and 4 show a milk bottle heater with a closed casing A. The slit mantle E in this case is carried by clasp like holders O mounted on the casing. Adjustment of it round the bottle F is effected by lever mechanism P, which can be operated from outside by a handle Q to close the clasp holders O with the mantle around the bottle. The fuel holder lies in a horizontal position, whilst the mantle after swinging out the prop J, lies at an angle over it, so that an effective spreading of the flame over the mantle is made possible.

Figure 5 shows a constructional example of a closed mantle E, which, being of a greater width, is closely adjusted around the bottle F by lateral springs $E^1$ arranged to clasp the mantle together in the manner shown in the drawing.

The mantle can for example also consist of obliquely woven wire netting, which can be pushed or pulled to adjust the diameter as desired.

What I claim is:

1. A milk bottle heater comprising a mantle of an adjustable wire netting to receive the bottle and operating means to closely adjust said mantle around bottles of any size as well as to allow its disengagement therefrom.

2. A milk bottle heater comprising a longitudinally slit mantle of wire netting, movable clasp like holders for the slit mantle to fold same round the bottle and operating means for said holders.

3. A milk bottle heater comprising a mantle of an adjustable wire netting to receive the bottle, operating means to closely adjust said mantle around bottles of any size as well as to allow its disengagement therefrom and a frame-work to carry said mantle and operating means, said framework being so arranged as to allow the mantle to be held in an oblique position.

4. A milk bottle heater comprising a mantle of an adjustable wire netting to receive the bottle, operating means to closely adjust said mantle around bottles of any size as well as to allow its disengagement therefrom and a frame-work to carry said mantle and operating means, said framework being provided with a burner situated below the mantle.

5. A milk bottle heater comprising a longitudinally slit mantle of wire netting, movable clasp like holders for the slit mantle to fold same round the bottle, operating means for said clasp like holders and a frame to carry said clasp like holders, the latter being so arranged as to constitute together a casing for the mantle and the bottle.

In witness whereof I have hereunto signed my name this 25th day of April, 1924, in the presence of two subscribing witnesses.

AUGUSTO BUSCH.

Witnesses:
AMAND BRAUN,
MADELEINE SPENGLER,